United States Patent
Tanaka et al.

(10) Patent No.: US 7,008,092 B2
(45) Date of Patent: Mar. 7, 2006

(54) VEHICULAR HEADLAMP WITH LENS HOLDER HAVING UPPER OPENING PORTION

(75) Inventors: Hideki Tanaka, Shizuoka (JP); Kaoru Yamamoto, Shizuoka (JP); Hisaya Kano, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 103 days.

(21) Appl. No.: 10/610,987

(22) Filed: Jun. 30, 2003

(65) Prior Publication Data

US 2004/0052085 A1 Mar. 18, 2004

(30) Foreign Application Priority Data

Jul. 1, 2002 (JP) .............................. 2002-191934

(51) Int. Cl.
*F21V 11/08* (2006.01)
(52) U.S. Cl. ...................... 362/539; 362/547
(58) Field of Classification Search ................. 362/16, 362/507, 516, 539, 544, 548, 247, 248, 296, 362/310, 342, 343, 344, 354, 3, 459, 487, 362/505, 506, 509, 519, 538, 543, 546, 227–236, 362/351, 361, 547
See application file for complete search history.

(56) References Cited

U.S. PATENT DOCUMENTS

| | | | | | |
|---|---|---|---|---|---|
| 1,539,090 | A | * | 5/1925 | King | 362/507 |
| 3,598,989 | A | * | 8/1971 | Biggs | 362/539 |
| 4,727,458 | A | * | 2/1988 | Droste et al. | 362/539 |
| 4,797,790 | A | * | 1/1989 | Brodling et al. | 362/538 |
| 4,895,693 | A | * | 1/1990 | Suzuki et al. | 362/544 |
| 5,070,432 | A | * | 12/1991 | Kitazumi et al. | 362/538 |
| 5,199,779 | A | * | 4/1993 | Sato | 362/539 |
| 5,353,204 | A | * | 10/1994 | Kawamura | 362/544 |
| 6,099,157 | A | * | 8/2000 | Waescher | 362/539 |
| 6,210,024 | B1 | * | 4/2001 | Shida | 362/342 |

FOREIGN PATENT DOCUMENTS

FR 2 753 148 3/1998

* cited by examiner

*Primary Examiner*—Thomas M. Sember
*Assistant Examiner*—Ismael Negron
(74) *Attorney, Agent, or Firm*—Fish & Richardson P.C.

(57) ABSTRACT

An apparatus includes a light chamber defined by a lamp body and a front cover. The apparatus houses a projection-type light source unit which integrates a reflector, a light source disposed in the vicinity of a first focal point of the reflector, a convex lens disposed in front of the reflector, and an extension reflector. The convex lens is disposed such that light external from the lamp chamber enters the lamp chamber and is reflected out through the convex lens.

5 Claims, 9 Drawing Sheets

VEHICULAR HEADLAMP WITH LENS HOLDER HAVING UPPER OPENING PORTION

CROSS-REFERENCE

This claims the benefit of Japanese patent Application No. 2002-191934 filed Jul. 1, 2002, which is incorporated herein in its entirety.

TECHNICAL FIELD OF THE INVENTION

The present invention relates to a vehicular headlamp having a projection-type light source unit integrating a reflector, a light source, and a convex lens. The reflector is opened forward and has a substantially ellipsoidal reflecting surface. The convex lens is disposed in front of the reflector via a cylindrical lens holder.

BACKGROUND OF THE INVENTION

FIG. 10 shows a headlamp that has a lamp chamber s defined by a container-shaped lamp body 1 and a transparent front cover 2. The headlamp houses a light source unit integrating a reflector 3, a light source 4, and a convex lens 6 disposed in front of the reflector 3 via a lens holder 5.

However, the light source unit of this headlamp is substantially sealed. Therefore, when the headlamp is not lit, the convex lens 6 of the light source unit appears dim through the front cover 2.

An extension reflector 7 has been provided around the light source unit to improve the overall appearance such that the entire interior of the light chamber s is provided with specular color when the headlamp is not lit. However, the dimness of the convex lens 6 is instead emphasized with respect to the brightness of the entire interior of the light chamber s.

SUMMARY OF THE INVENTION

In a vehicular headlamp according to an embodiment of the present invention, a lamp chamber defined by a lamp body and a transparent front cover houses a projection-type light source unit integrating a reflector which is opened forward and has a substantially ellipsoidal reflecting surface, a light source disposed in the vicinity of a first focal point of the reflector, and a convex lens disposed in front of the reflector via a cylindrical lens holder, and an extension reflector disposed to surround the light source unit.

The lens holder is provided with an upper opening portion. The extension reflector extends to the rear of the upper opening portion of the lens holder. Therefore, during daytime, light transmitted through the front cover and reaching the interior of the lamp chamber enters the interior of the projection-type light source unit via the upper opening portion of the lens holder, without being shielded by the extension reflector. Accordingly, the interior of the projection-type light source unit appears bright, and thus the convex lens of the light source unit seen through the front cover does not appear as dim as in conventional cases. In particular, because of the extension reflector disposed around the light source unit, the entire interior of the lamp chamber appears bright with specular color, which visually improves the appearance of the headlamp.

In a vehicular headlamp according to another embodiment of the present invention, a lamp chamber defined by a lamp body and a transparent front cover houses a projection-type light source unit integrating a reflector which is opened forward and has a substantially ellipsoidal reflecting surface, a light source disposed in the vicinity of a first focal point of the reflector, a convex lens disposed in front of the reflector via a cylindrical lens holder, and a second reflector which is disposed above the light source unit and has a second light source.

The lens holder is provided with an upper opening portion, and the second reflector is disposed at a rear part of the upper opening portion of the lens holder which has a second light source.

During daytime, light transmitted through the front cover and reaching the interior of the lamp chamber enters the interior of the projection-type light source unit via the upper opening portion of the lens holder, without being shielded by the second reflector above the projection-type light source unit. Accordingly, the interior of the projection-type light source unit appears bright. Thus, the convex lens of the light source unit seen through the front cover does not appear as dim as in conventional cases.

A vehicular headlamp according to another embodiment of the present invention is structured such that a glare light protection shade for shielding glare light that passes through the upper opening portion and radiates outward is provided between the light source and the upper opening portion of the lens holder. A reflective and decorative treatment is provided on a front surface of the glare light protection shade.

When the upper opening portion is provided in the lens holder, light from the light source can pass through the upper opening portion and radiate diagonally upward and forward to cause glare. However, the glare light protection shade shields the light that can pass through the upper opening portion of the lens holder diagonally upward and forward. Accordingly, it prevents glare light from being generated.

Furthermore, the reflection-treated surface, which is the front surface of the glare light protection shade, reflects light that is guided into the interior of the projection-type light source unit via the upper opening portion of the lens holder forward towards the convex lens. Therefore, the rear part of the convex lens appears brighter, and thus the dimness of the convex lens is further reduced when the headlamp is not lit. Meanwhile, the decoration-treated surface, which is the front surface of the glare light protection shade, is illuminated brightly by the incoming light guided into the interior of the projection-type light source unit via the upper opening portion of the lens holder. Accordingly, a decorative pattern can be seen through the convex lens when the lamp is not lit.

A vehicular headlamp according to still another embodiment is structured such that the upper opening portion of the lens holder is covered with the front cover inclining rearward.

Because the front cover covering the upper opening portion of the lens holder is inclined rearward, an amount of incoming light entering the interior of the light source unit from the upper opening portion of the lens holder is increased.

DETAILED DESCRIPTION OF THE INVENTION

Figure 1:
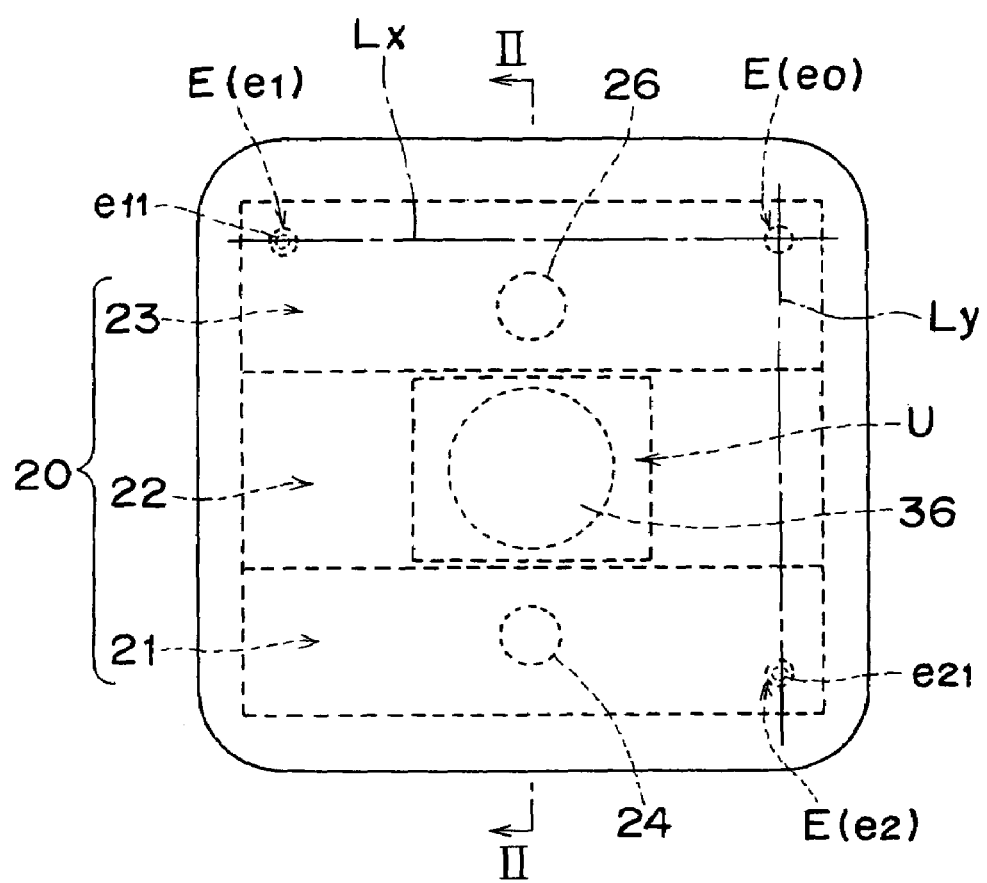
FIG. 1 shows a front elevational view of a combination head lamp according to an embodiment of the present invention.
Figure 2:
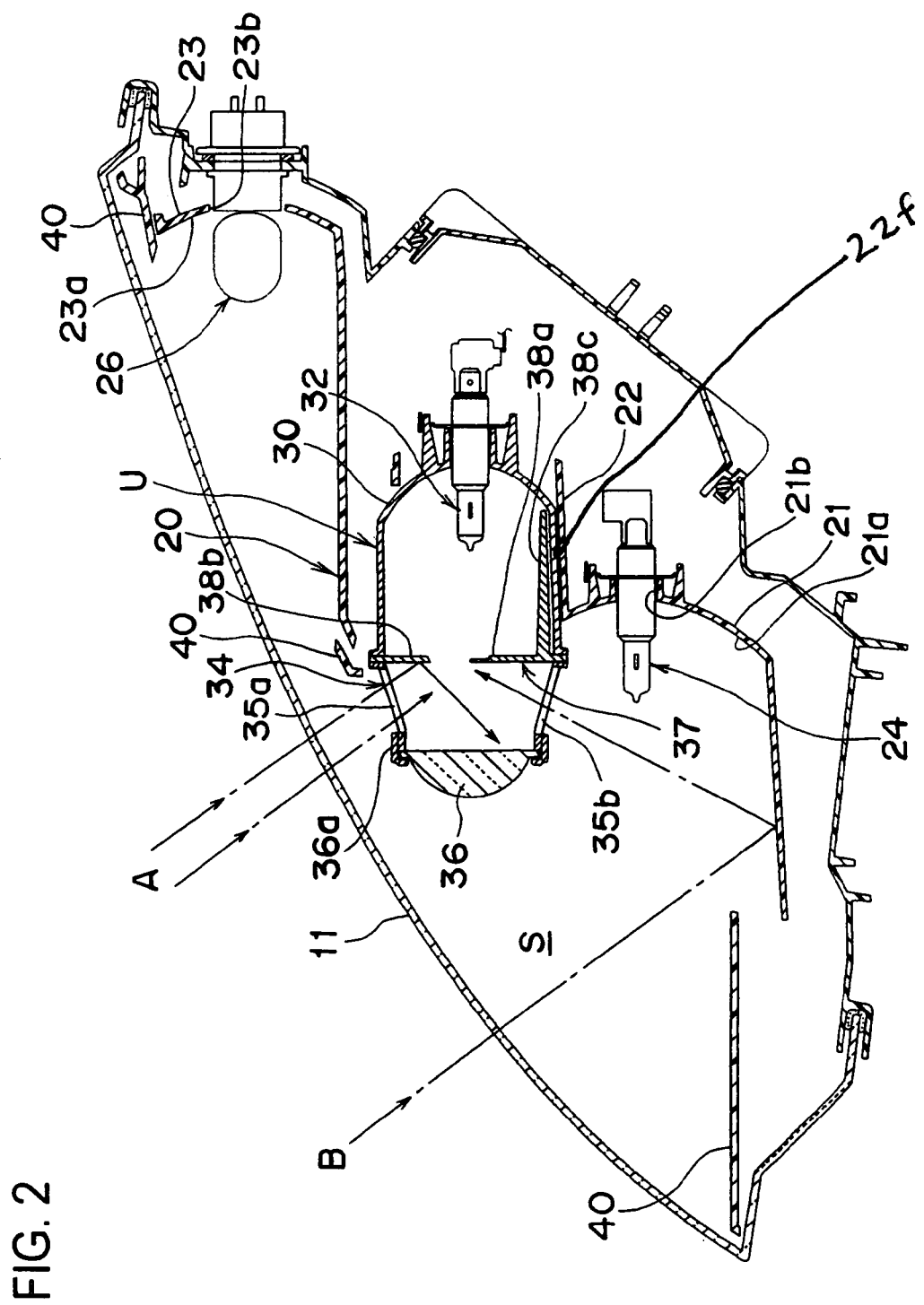
FIG. 2 shows a vertical sectional view of the headlamp (the sectional view taken along the line, II—II in FIG. 1).
Figure 3:
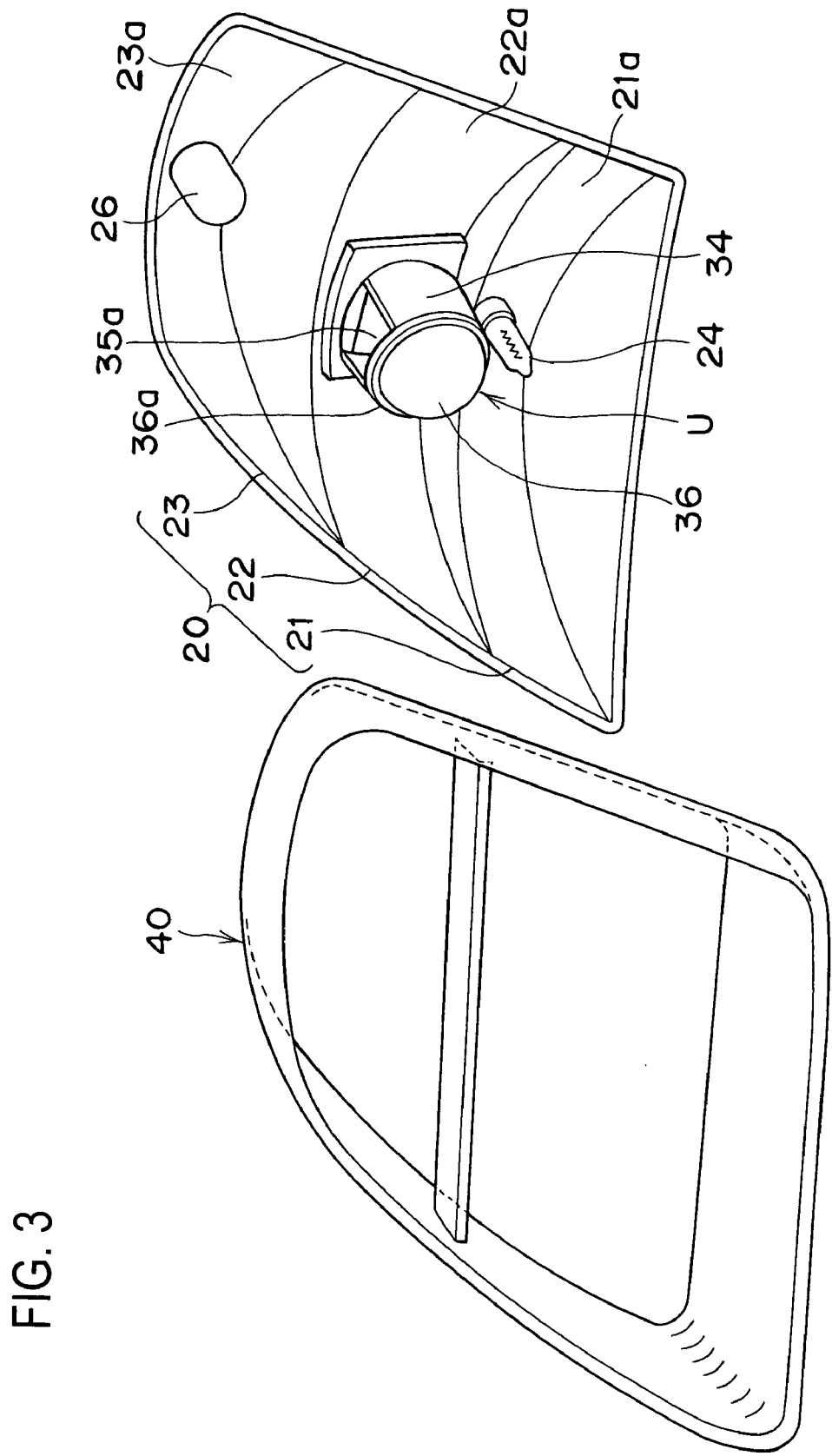
FIG. 3 shows an exploded perspective view of a reflector unit and an extension reflector of the headlamp.
Figure 4:
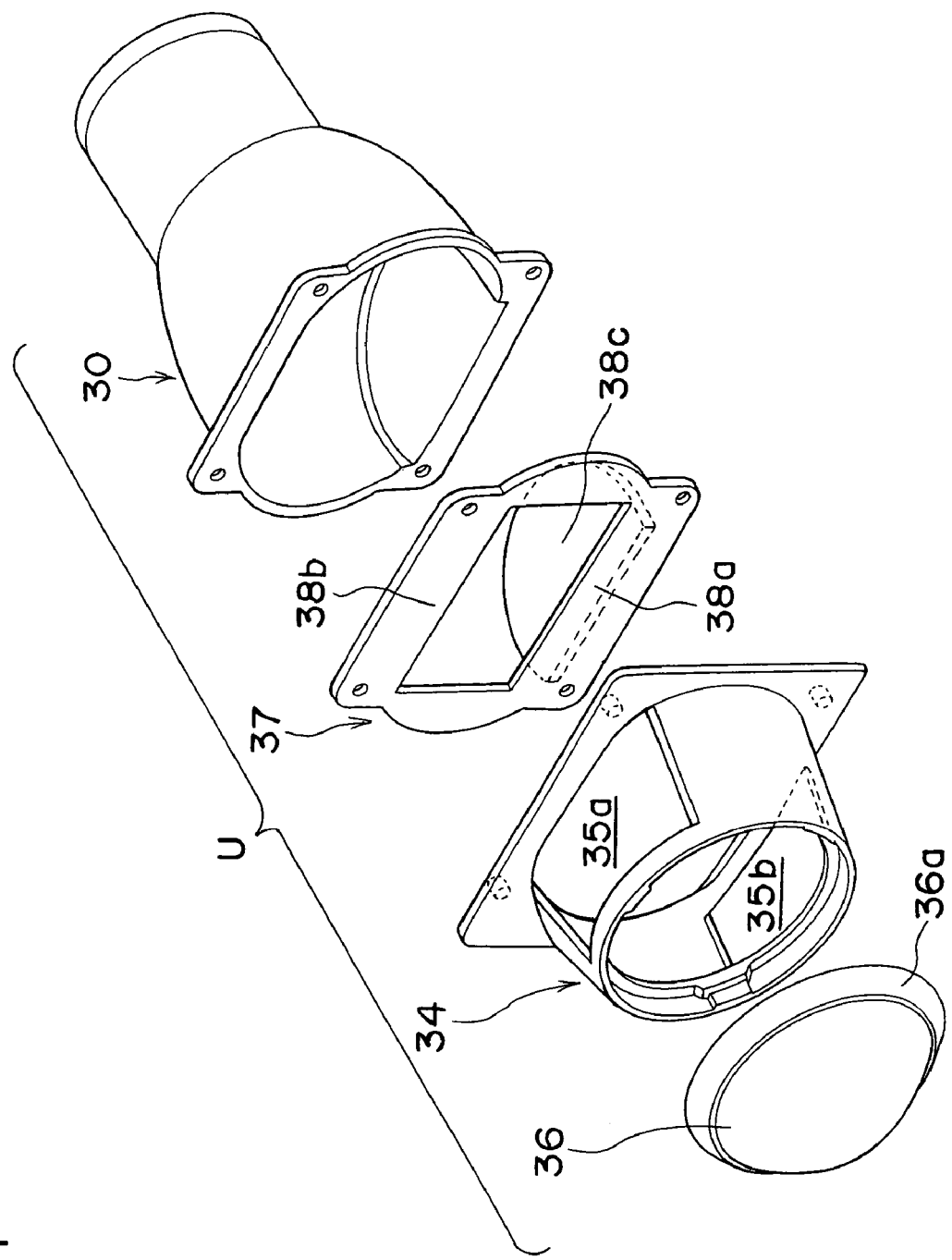
FIG. 4 shows an exploded perspective view of a light source unit for generating a low beam, which is a portion of the headlamp.

FIGS. 1 to 4 show a first embodiment of the present invention. FIG. 1 shows a front elevational view of a vehicular combination headlamp, which is one embodiment of the present invention. FIG. 2 shows a vertical sectional view of the headlamp (the sectional view taken along a line II—II in FIG. 1). FIG. 3 shows an exploded perspective view of a reflector unit and an extension reflector of the headlamp. FIG. 4 shows an exploded perspective view of a light source unit for generating a low beam, which is a portion of the headlamp.

A container-shaped lamp body 10 has an opened front surface. A transparent front cover 11 is attached to the front surface opening portion of the lamp body 10 to define a light chamber S. In the light chamber S, a tiltable reflector unit 20 is provided with an aiming mechanism E constituted by an aiming fulcrum e0 with a ball bearing structure and a pair of aiming points (a left-right aiming point e1 and an up-down aiming point e2).

The reflector unit 20 is an integrally molded body of synthetic resin (such as BMC resin) structured with a reflector 21 for generating a high beam at the undermost portion, a pseudo-reflector 22 with an attached projection-type light source unit U for generating a low beam thereabove, and a reflector 23 corresponding to a turn signal lamp at the uppermost portion. These reflectors are formed such that each reflector is consecutively set back in order from the reflector 21 at the undermost portion to the reflector 23 at the uppermost portion. An aluminum vapor deposition process is conducted on a surface of each of the reflectors.

The reflector 21 is provided with a substantially parabolic operative reflecting surface 21a extending along the right and left directions. Further, a bulb 24 for generating a high beam of the headlamp is attached to a bulb insertion hole 21b that is provided at a rear top portion of the reflector 21.

A substantially parabolic pseudo-reflecting surface 22a extending along the right and left directions is provided on the pseudo-reflector 22. Further, the light source unit U for generating a low beam of the headlamp is fixed by securing means, such as a screw and a concave-convex lance engagement, to an attachment frame 22f provided in a central portion of the reflector 22 in the horizontal direction.

The projection-type light source unit U is integrally structured by a reflector 30 that is opened forward and has a substantially ellipsoidal reflecting surface, a bulb 32 for generating a low beam of the headlamp that is disposed such that a filament is positioned in the vicinity of a first focal point of the reflector 30, and a convex lens 36 that is disposed to the front of the reflector 30 via a cylindrical lens holder 34. A light shielding shade 38a for forming a clear cut line of the low beam is vertically provided at a position that is in the vicinity of a second focal point of the reflector 30 and at a focal point of the convex lens 36. The light shielding shade 38a is integrally formed with a shade member 37, and the shade member 37 is integrated into the light source unit U by being sandwiched by the reflector 30 and the lens holder 34. Reference numeral 36a refers to a metal fitting for securing the convex lens 36 to the lens holder 34.

Moreover, a substantially parabolic reflecting surface 23a extending along the right and left directions is provided on the uppermost portion of the reflector 23. Further, a bulb 26 for a turn signal lamp attached to the lamp body 10 is disposed such that it protrudes from an opening portion 23b provided at the rear top portion of the reflector 23 to the front of the substantially parabolic reflecting surface 23a.

Further, tilting the reflector unit 20 by the aiming mechanism E allows adjustment of optical axes of the headlamp (an optical axis of the high beam and an optical axis of the low beam) in the up-down and right-left directions. Specifically, rotation of a left-right aiming screw e11 allows the left-right aiming point e1 to advance or retreat, and the reflector unit 20 to tilt around a vertically tilted axis Ly (an axis that passes through the aiming fulcrum e0 and the up-down aiming point e2). Further, rotation of an up-down aiming screw e21 allows the up-down aiming point e2 to advance or retreat, and the reflector unit 20 to tilt around a horizontally tilted axis Ly (an axis that passes through the aiming fulcrum e0 and the left-right aiming point e1). Accordingly, the optical axes of the headlamp can be adjusted in the up-down and right-left directions.

The front surface opening portion of the lamp body 10 opens widely from the diagonally upward and forward direction toward the side, and the transparent front cover 11 which is significantly inclined from the front toward the rear is attached. Thus, the entire reflector unit 20 in the light chamber S is covered with the transparent front cover 11 overhead. The extension reflector 40 on which an aluminum vapor deposition process is conducted similar to the surface treatment on the reflector unit 20 at a position surrounding the reflector unit 20 is disposed in the light chamber S. When the lamp is not lit, the interior of the light chamber S is seen through the transparent front cover 11 from a position forward of the vehicle, and the entire interior of the light chamber S appears bright with specular color.

Furthermore, the lens holder 34 that constitutes the projection-type light source unit U is provided with an upper opening portion 35a and a lower opening portion 35b for guiding outside light into the light source unit U. Accordingly, a portion behind the convex lens 36 appears brighter, thereby overcoming a conventional problem in which the convex lens 36 appears dim through the front cover when the lamp is not lit. Specifically, the extension reflector 40 and the reflector 23 are provided at the rear part of the upper opening portion 35a of the lens holder 35 of the light source unit U. Therefore, during the daytime when the light source of the headlamp is not lit, as shown in FIG. 2, light transmitted through the transparent front cover 11 that reaches the interior of the light chamber S is not shielded by the extension reflector 40 or the reflector 23. Instead, it penetrates to the interior of the projection-type light source unit U, via the upper opening portion 35a of the lens holder as shown by arrow A, or via the lower opening portion 35b of the lens holder as shown by arrow B. Therefore, the interior of the projection-type light source unit U appears bright, and the convex lens 36 of the light source unit U which is seen through the transparent front cover 11 does not appear as dim as in the conventional cases. In particular, the entire interior of the light chamber S appears bright with specular color because of the reflector unit 20 and the extension reflector 40 disposed therearound. Further, because the dimness of the convex lens 36 of the light source unit U is reduced, the headlamp is visually improved.

Moreover, a glare light protection shade 38b for preventing glare, which is integrally formed with the shade member 37, is vertically provided at a rear side edge portion of the upper opening portion 35a of the lens holder 34. That is, the upper opening portion 35a in the lens holder 34 may allow direct light from the bulb 32 or light reflected by a bottom surface of an inner side of the reflector 30 to pass through the upper opening portion 35a and radiate diagonally upward and forward to cause glare. However, the glare light protection shade provided between the bulb 32 and the upper opening portion 35a of the lens holder 34 shields that light passing through the upper opening portion 35a of the lens holder 34 that is emitted diagonally upward and forward, thereby preventing glare.

Moreover, a tongue-shaped horizontal extending portion 38c is integrally formed with the shade member 37 and extends along the non-operative reflecting surface which is on the lower portion of the inner side of the reflector 30. Heat-resistant black paint is applied on a top surface of the tongue-shaped horizontal extending portion 38c for reducing reflected light directed toward the upper opening portion 35a of the lens holder 34, thereby suppressing glare.

An aluminum vapor deposition-treated surface is provided on the front surface of the glare light protection shade 38b. Light is directed diagonally upward and forward to the upper opening portion 35a of the lens holder 34, as shown by the arrow A in FIG. 2, reflected by the front surface of the glare light protection shade 38b (the aluminum vapor deposition-treated surface), then guided to the convex lens 36. Therefore, the dimness of the convex lens 36 is further averted.

Note that the glare light protection shade 38b, the light shielding shade 38a, and the tongue-shaped horizontal extending portion 38c are integrally formed with the shade member 37 manufactured from aluminum die-cast. Although, it is possible to integrally form these shades 38a, 38b into the lens holder 34 or the reflector 30, this involves complicated manufacturing equipment including a die structure for undercutting. Therefore, integrally forming the glare light protection shade 38b and the light shielding shade 38a into the shade member 37, which is separate from the lens holder 34 and the reflector 30, simplifies manufacturing of the lens holder 34 and the reflector 30.

Moreover, heat-resistant black paint may be applied on the non-operative reflecting surface at the lower portion of the inner side of the reflector 30 without providing the tongue-shaped horizontal extending portion 38c in the shade member 37. However, because it is difficult to apply a paint at a predetermined position within the reflector 30, painting the inner side of the reflector 30 is avoided by integrally providing the tongue-shaped horizontal extending portion 38c in the shade member 37, and applying heat-resistant black paint on the flattened tongue-shaped horizontal extending portion 38c.

Figure 5:
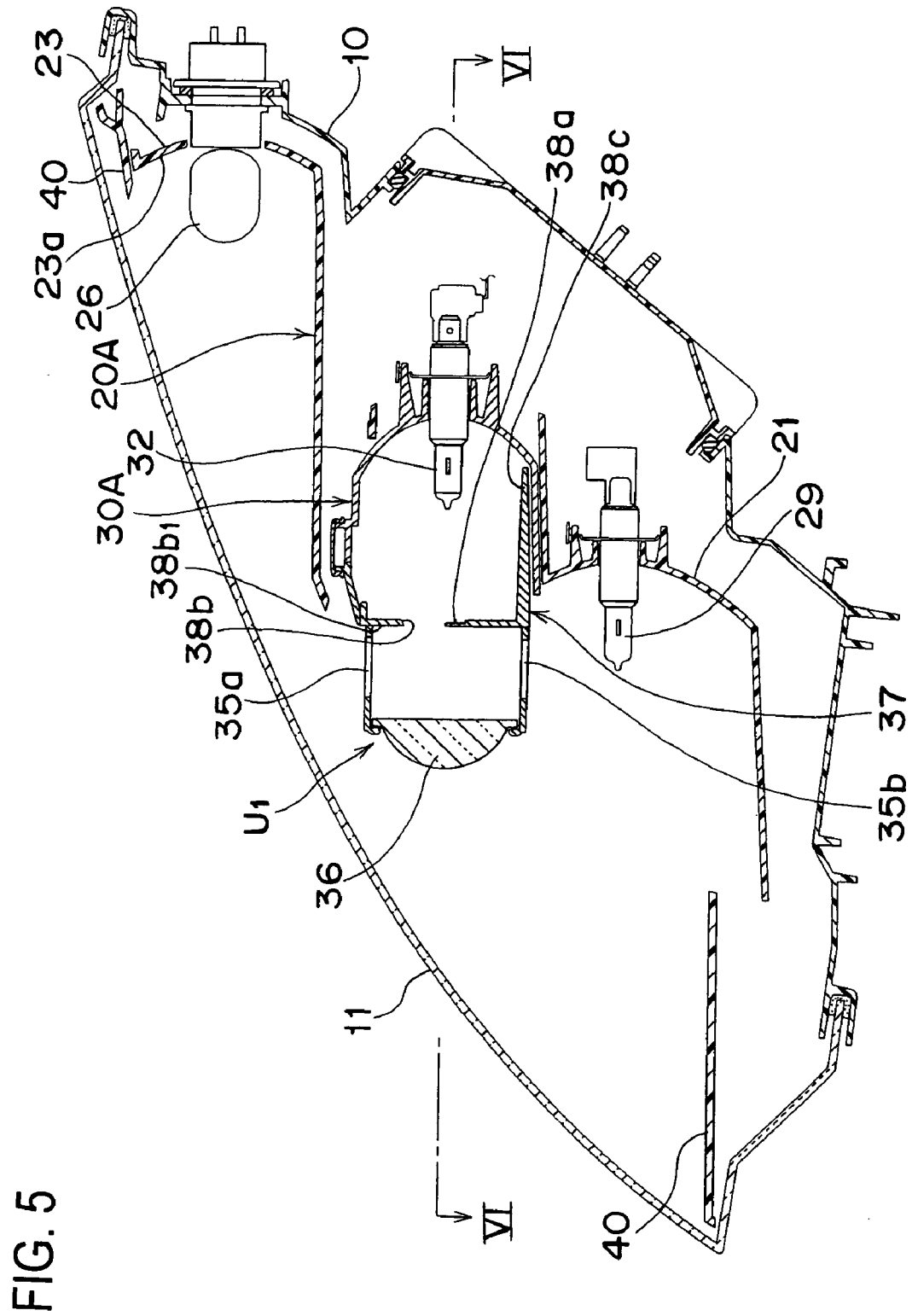
FIG. 5 shows a vertical sectional view of a combination headlamp according to another embodiment of the present invention.
Figure 6:
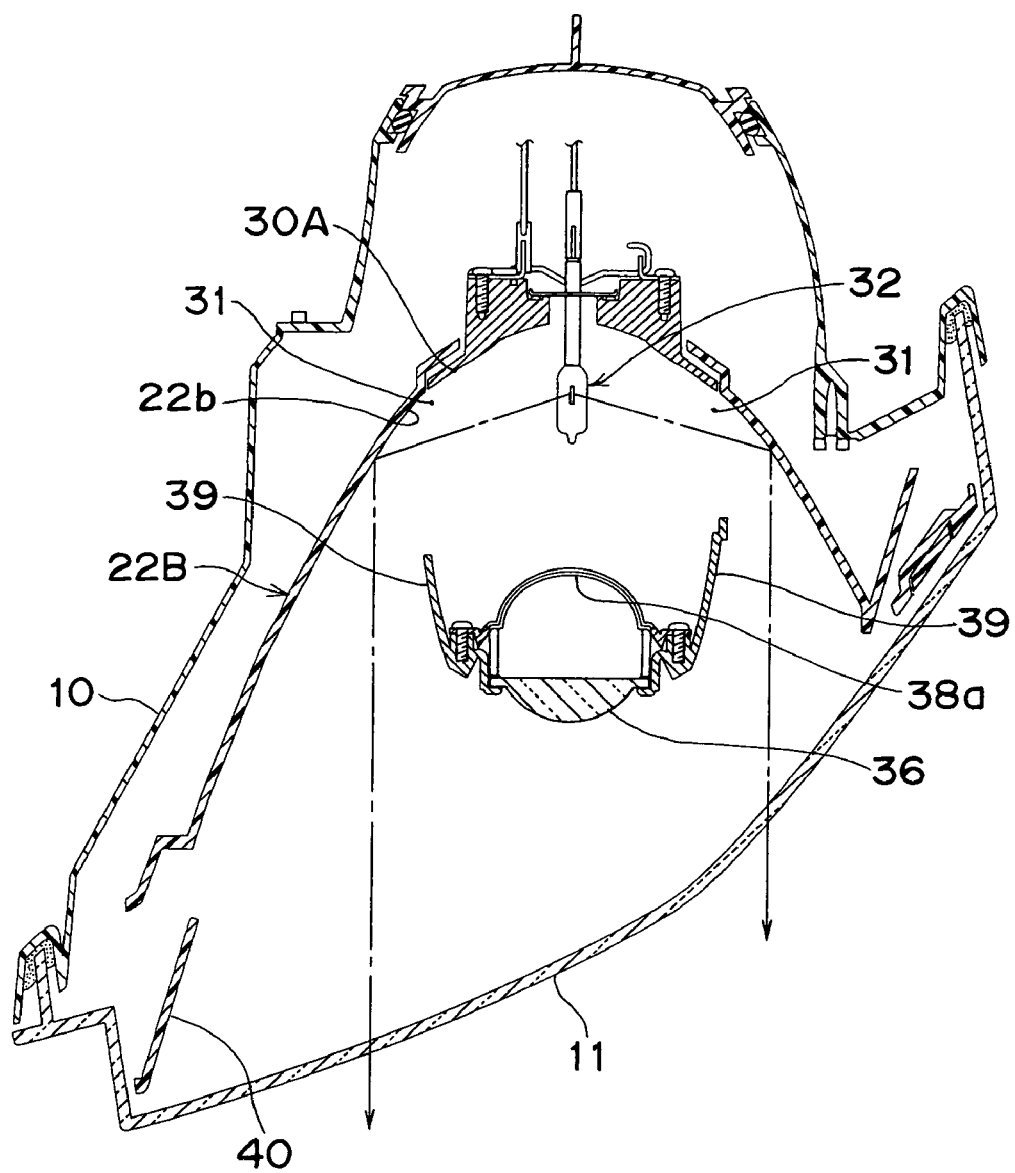
FIG. 6 shows a vertical sectional view of the headlamp (the sectional view taken along a line VI—VI in FIG. 5).
Figure 7:
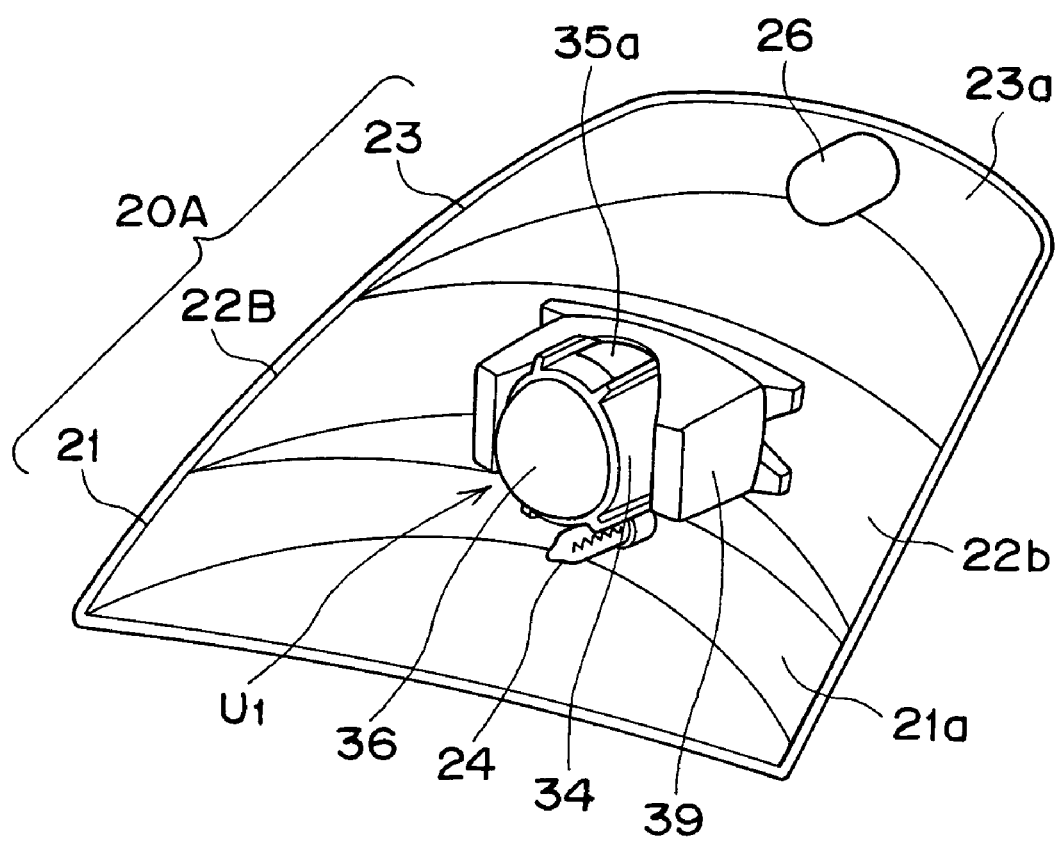
FIG. 7 shows a perspective view of a reflector unit.
Figure 8:
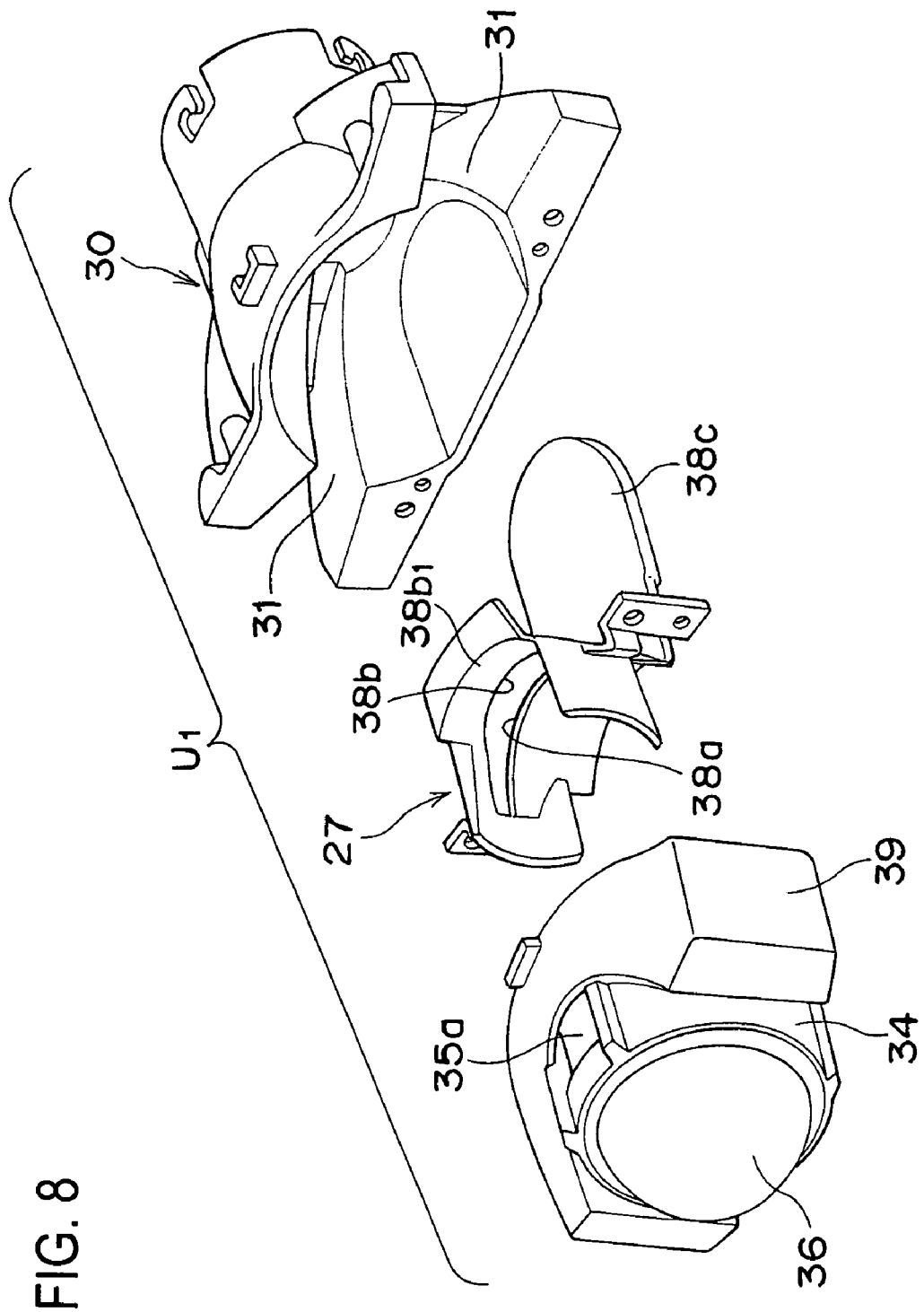
FIG. 8 shows an exploded perspective view of a light source unit for generating a low beam, which is a portion of the headlamp.
Figure 9:
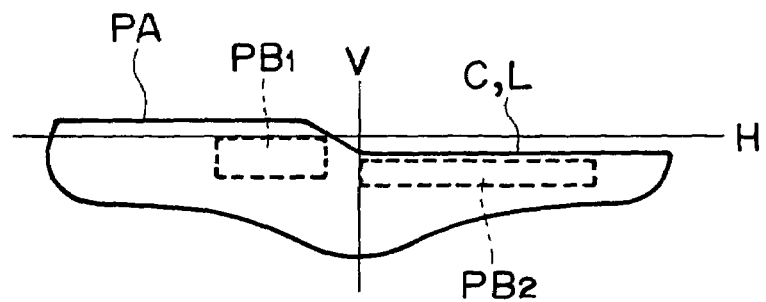
FIG. 9 shows a light distribution pattern of the low beam.
Figure 10:
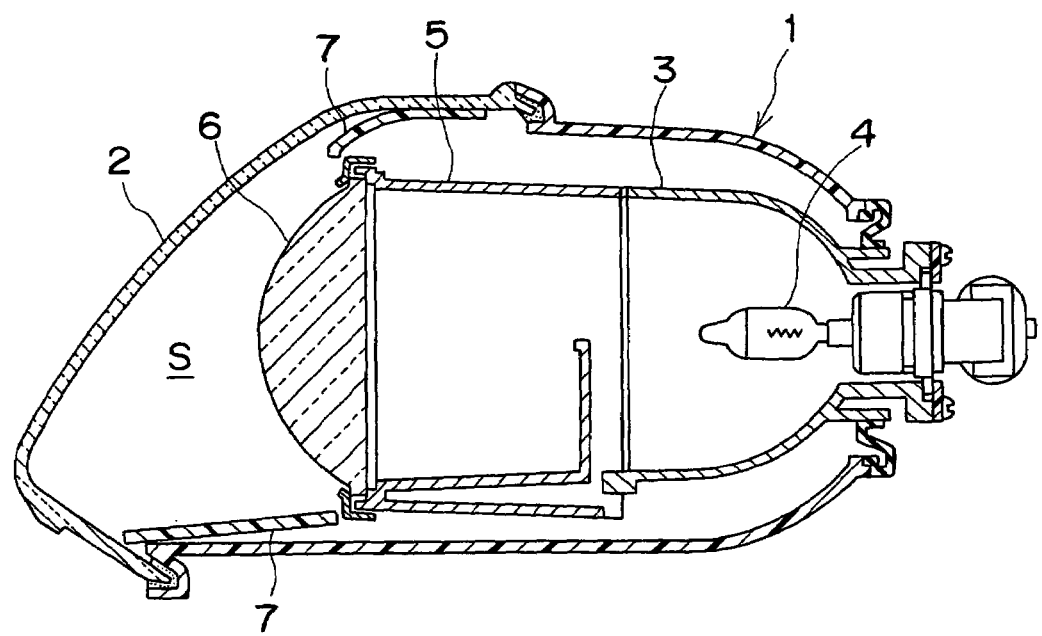
FIG. 10 shows a vertical sectional view of a conventional headlamp.

FIGS. 5 to 9 show a second embodiment of the present invention. FIG. 5 shows a vertical sectional view of a vehicular combination headlamp. FIG. 6 shows a vertical sectional view of the headlamp (the sectional view taken along a line VI—VI in FIG. 5). FIG. 7 shows a perspective view of the reflector unit. FIG. 8 shows an exploded perspective view of the light source unit for generating a low beam, which is a portion of the headlamp. FIG. 9 shows a light distribution pattern of the low beam.

In the aforementioned embodiment, the reflector 30, which is a structural member of the light source unit U, is shaped like a container and forwardly opened, and the pseudo-reflector 22 is provided behind the light source unit U. However, a part of the right and left side walls of a reflector 30A is cut out, and a substantially parabolic sub-reflector 22B, which is integrally formed into a reflector unit 20A and has an operative reflecting surface 22b, is provided behind a light source unit U1. As shown by arrows in FIG. 6, a part of light from the bulb 32 is directed sideward via cutouts 31 then reflected and distributed by the sub-reflector 22B to the front. Accordingly, visibility of the low beam is enhanced.

Specifically, the lens holder 34 is provided with upper and lower opening portions 35a, 35b similar to that of the aforementioned embodiment. Further, the lens holder 34 is provided with a skirt portion 39 that sets the amount of light emission sideward by defining the cutouts 31 of the reflector 30. Therefore, as shown in FIG. 9, a light distribution by projection from the convex lens 36 of the light source unit U1 creates a pattern PA having a clear cut line CL, and light is emitted sideward from the cutouts 31 of the reflector 30A. Further, light distributed by the operative reflecting surface 22b of the reflector 22B creates patterns PB1, PB2 along the clear cut line CL, which are close to the center. Next, the patterns PA, PB1, PB2 are synthesized to create a distribution pattern of the low beam.

Moreover, the front surface of the glare light protection shade 38b is provided with a decoration-treated surface 38b1 decorated with characters and patterns. The decoration-treated surface 38b1, which is the front surface of the shade, is illuminated brightly by light guided to the interior of the projection-type light source unit U via the upper opening portion 35a of the lens holder 34. Thus, when the lamp is not lit, the decorative pattern of the decoration-treated surface 38b1 is seen through a convex lens 36. Therefore, the overall appearance can be innovative and original.

Other structures are the same as structures described in the aforementioned first embodiment. By denoting the same reference numerals, explanations are omitted to avoid redundancy.

Note that, in the aforementioned embodiments the reflector 23 for the turn signal lamp is integrally formed with the reflector unit 20 (20A) which is tiltably supported by the aiming mechanism E. Alternatively, the reflector 23 may be structured separately from the reflector unit 20 (20A) and secured to the lamp body 10. In this case, the left-right aiming point e1 and the aiming fulcrum e0 that constitute the aiming mechanism E are at positions below the positions shown in FIG. 1.

Other implementations are within the scope of the following claims.

What is claimed is:

1. A vehicular headlamp comprising:
   a lamp chamber defined by a lamp body and a transparent front cover;
   a light source unit housed in the lamp chamber;
   a reflector integrated with the light source unit, said reflector having a substantially ellipsoidal reflecting surface;
   a light source provided in the light source unit and disposed in the vicinity of a focal point of the reflector;
   a cylindrical lens holder attached to an opened end of the reflector, said cylindrical lens holder having an additional opening at its upper side;

a convex lens disposed in front of the reflector through the cylindrical lens holder wherein light external from the lamp chamber can enter through the additional opening and be reflected out through the convex lens; and a glare light protection shade for preventing glare light emitted by the light source from passing through the additional opening of the cylindrical lens holder, and for reflecting out through the convex lens, light that is external from the lamp chamber and that enters through the additional opening, said glare light protection shade being provided between the light source and the additional opening.

2. The vehicular headlamp according to claim 1 wherein said glare light protection shade has a glare-reducing front surface.

3. The vehicular headlamp according to claim 1, wherein the upper opening portion of the cylindrical lens holder is covered with the transparent front cover inclining rearward.

4. A vehicular headlamp comprising:

a lamp chamber defined by a lamp body and a transparent front cover;

a light source unit housed in the lamp chamber;

a first reflector integrated with the light source unit, said reflector having a substantially ellipsoidal reflecting surface;

a first light source provided in the light source unit and disposed in the vicinity of a focal point of the first reflector;

a cylindrical lens holder attached to an opened end of the first reflector, said cylindrical lens holder having an additional opening at its upper side;

a convex lens disposed in front of the first reflector through the cylindrical lens holder; and a second reflector disposed above the light source unit and having a second light source at its center, and said second reflector disposed at a rear part of the upper opening of the cylindrical lens holder.

5. The vehicular headlamp according to claim 4 further comprising:

a glare light protection shade for shielding glare light that passes through the upper opening portion and is emitted outward, said glare light protection shade being provided between the first light source and the upper opening portion of the lens holder, and a front surface of the glare light protection shade being treated and decorated to prevent glare.

* * * * *